United States Patent
Chen et al.

(10) Patent No.: US 10,574,730 B2
(45) Date of Patent: Feb. 25, 2020

(54) STREAMING MEDIA RESOURCE DOWNLOADING METHOD AND APPARATUS, AND TERMINAL DEVICE

(71) Applicant: Huawei Technologies Co., Ltd., Shenzhen, Guangdong (CN)

(72) Inventors: Cheng Chen, Wuhan (CN); Wei Dong, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 162 days.

(21) Appl. No.: 15/559,816

(22) PCT Filed: Mar. 20, 2015

(86) PCT No.: PCT/CN2015/074694
§ 371 (c)(1),
(2) Date: Sep. 19, 2017

(87) PCT Pub. No.: WO2016/149863
PCT Pub. Date: Sep. 29, 2016

(65) Prior Publication Data
US 2018/0054470 A1    Feb. 22, 2018

(51) Int. Cl.
*H04L 29/08* (2006.01)
*H04N 21/238* (2011.01)
(Continued)

(52) U.S. Cl.
CPC ............ *H04L 67/06* (2013.01); *H04L 5/0064* (2013.01); *H04L 29/06469* (2013.01);
(Continued)

(58) Field of Classification Search
CPC .. H04L 43/0888; H04L 43/16; H04L 65/1069
See application file for complete search history.

(56) References Cited

U.S. PATENT DOCUMENTS

2001/0036271 A1* 11/2001 Javed ................. H04N 7/17327
380/217
2005/0076136 A1    4/2005 Cho et al.
(Continued)

FOREIGN PATENT DOCUMENTS

CN    1490980 A    4/2004
CN    1863030 A    11/2006
(Continued)

*Primary Examiner* — Shean Tokuta
(74) *Attorney, Agent, or Firm* — Kilpatrick Townsend & Stockton LLP

(57) ABSTRACT

A streaming media resource downloading method includes: determining that a first media file is a to-be-downloaded media file according to first network bandwidth, where the first media file is included in a streaming media resource corresponding to the first network bandwidth, and the first media file includes N data blocks; and after an $(n-1)^{th}$ data block in the first media file is downloaded, and before an $n^{th}$ data block in the first media file is downloaded, determining a length of the to-be-downloaded $n^{th}$ data block according to network bandwidth reduction times in an executed first media file downloading process, where $1 \leq n \leq N$. Therefore, a length of a to-be-downloaded data block is adjusted according to the network bandwidth reduction times in the first media file downloading process so that video playing can better adapt to a bandwidth change, and streaming media resource switching times are reduced.

18 Claims, 3 Drawing Sheets

---

Determine that a first media file is a to-be-downloaded media file according to first network bandwidth — 101

After an $(n-1)^{th}$ data block in the first media file is downloaded, and before an $n^{th}$ data block in the first media file is downloaded, determine a length of the to-be-downloaded $n^{th}$ data block according to network bandwidth reduction times in an executed first media file downloading process — 102

(51) Int. Cl.
*H04N 21/24* (2011.01)
*H04L 5/00* (2006.01)
*H04L 29/06* (2006.01)
*H04N 21/222* (2011.01)

(52) U.S. Cl.
CPC ....... *H04N 21/2223* (2013.01); *H04N 21/238* (2013.01); *H04N 21/24* (2013.01); *H04N 21/2402* (2013.01)

(56) References Cited

U.S. PATENT DOCUMENTS

| | | | |
|---|---|---|---|
| 2006/0093312 A1* | 5/2006 | Park | G11B 20/10 386/240 |
| 2006/0242275 A1* | 10/2006 | Shapiro | H04N 7/17318 709/220 |
| 2011/0032428 A1* | 2/2011 | Bing | H04N 21/234381 348/608 |
| 2011/0061086 A1 | 3/2011 | Huang | |
| 2012/0084803 A1* | 4/2012 | Johansson | H04N 21/23106 725/25 |
| 2012/0324123 A1* | 12/2012 | Fox | G06F 15/781 709/231 |
| 2012/0331111 A1* | 12/2012 | Wu | H04W 28/065 709/219 |
| 2013/0007200 A1* | 1/2013 | van der Schaar | H04L 47/12 709/217 |
| 2013/0064287 A1* | 3/2013 | Karlsson | H04N 19/46 375/240.02 |
| 2013/0124679 A1* | 5/2013 | Harrang | H04L 65/4023 709/217 |
| 2014/0032658 A1* | 1/2014 | Falls | H04N 21/234309 709/204 |
| 2014/0089469 A1* | 3/2014 | Ramamurthy | H04L 65/60 709/219 |
| 2014/0123162 A1* | 5/2014 | Karlsson | H04N 21/4331 725/12 |
| 2014/0233637 A1 | 8/2014 | Saleem et al. | |
| 2015/0188962 A1* | 7/2015 | Bulava | H04L 65/4076 709/231 |
| 2015/0188963 A1* | 7/2015 | Bulava | H04L 67/10 709/219 |
| 2015/0249845 A1* | 9/2015 | Tirosh | H04H 60/05 725/62 |
| 2017/0054649 A1* | 2/2017 | Mamidwar | H04L 47/624 |
| 2017/0126765 A1* | 5/2017 | Taibi | H04L 65/4084 |
| 2017/0264657 A1* | 9/2017 | Lee | H04B 17/318 |
| 2017/0374117 A1* | 12/2017 | Park | H04L 65/4084 |
| 2018/0324427 A1* | 11/2018 | Cheong | H04N 19/124 |
| 2018/0359522 A1* | 12/2018 | Pikus | H04N 21/2312 |

FOREIGN PATENT DOCUMENTS

| | | | |
|---|---|---|---|
| CN | 102065458 A | 5/2011 | |
| CN | 102065468 A | 5/2011 | |
| CN | 102710374 A | 10/2012 | |
| CN | 102843351 A | 12/2012 | |
| CN | 103281569 A | 9/2013 | |
| CN | 103929684 A | 7/2014 | |
| CN | 104022845 A | 9/2014 | |
| EP | 1833211 B1 | 8/2014 | |
| EP | 2903219 B1 | 4/2017 | |
| KR | 20160038586 A | * 4/2016 | .......... H04B 17/318 |
| WO | 2014041547 A1 | 3/2014 | |

* cited by examiner

STREAMING MEDIA RESOURCE DOWNLOADING METHOD AND APPARATUS, AND TERMINAL DEVICE

CROSS-REFERENCE TO RELATED APPLICATIONS

This application is a National Stage of International Application No. PCT/CN2015/074694, filed on Mar. 20, 2015, which is hereby incorporated by reference in its entirety.

TECHNICAL FIELD

Embodiments of the present invention relate to the field of network transmission, and in particular, to a streaming media resource downloading method and apparatus, and a terminal device.

BACKGROUND

HTTP (HyperText Transfer Protocol, Hypertext Transfer Protocol) Live Streaming (HLS) is an HTTP-based streaming media network transmission protocol put forward by Apple. A streaming media is a media playing format on a network in a streaming transmission manner. A principle of the HLS protocol is dividing a streaming media resource into multiple HTTP-based TS (Transport Stream, transport stream) media files with a same time length for transmission. Each TS media file in a streaming media resource is independent, and multiple TS media files form one consecutive streaming media resource. When a terminal device plays a streaming media resource located on a network side, the terminal device attempts to match, according to detected network bandwidth, a corresponding streaming media resource for downloading. When the network bandwidth changes, a client attempts tore-match, according to changed network bandwidth, a streaming media resource for downloading.

When network bandwidth changes within a large range or frequently fluctuates, a detected network bandwidth value and an actual network bandwidth value have a relatively large difference. However, to adapt to a network bandwidth change, a terminal device still attempts to frequently match a new streaming media resource according to a detected network bandwidth value for downloading. Therefore, a downloaded streaming media resource may not match actual network bandwidth, and further video playing is not smooth.

SUMMARY

Embodiments of the present invention provide a streaming media resource downloading method and apparatus, and a terminal device, so as to reduce streaming media resource switching times when network bandwidth changes within a large range or frequently fluctuates, so that video playing is smooth.

According to a first aspect, a streaming media resource downloading method is provided, including:

determining that a first media file is a to-be-downloaded media file according to first network bandwidth, where the first network bandwidth is network bandwidth when it is determined that the first media file is a to-be-downloaded media file; and the first media file is included in a streaming media resource corresponding to the first network bandwidth, and the first media file includes N data blocks, where N≥2, and N is an integer; and after an $(n-1)^{th}$ data block in the first media file is downloaded, and before an $n^{th}$ data block in the first media file is downloaded, determining a length of the to-be-downloaded $n^{th}$ data block according to network bandwidth reduction times in an executed first media file downloading process, where $1 \geq n \geq N$.

In a first possible implementation manner of the first aspect, the method further includes:

periodically detecting network bandwidth in the first media file downloading process; and obtaining the network bandwidth reduction times in the executed first media file downloading process according to the periodically detected network bandwidth.

With reference to the first aspect or the first possible implementation manner of the first aspect, in a second possible implementation manner, the determining a length of the to-be-downloaded $n^{th}$ data block according to network bandwidth reduction times in an executed first media file downloading process specifically includes:

when the network bandwidth reduction times in the executed first media file downloading process are equal to 0, determining that the length of the to-be-downloaded $n^{th}$ data block is a preset length, where the preset length is corresponding to the first media file; or when the network bandwidth reduction times in the executed first media file downloading process are greater than 0 and less than a first threshold, determining that the length of the to-be-downloaded $n^{th}$ data block is less than the preset length.

With reference to the second possible implementation manner of the first aspect, in a third possible implementation manner, the method further includes: when the network bandwidth reduction times in the executed first media file downloading process are greater than 0 and less than the first threshold, using the following rules to determine the length of the to-be-downloaded $n^{th}$ data block:

when there are more network bandwidth reduction times in the executed first media file downloading process, determining that the length of the $n^{th}$ data block is smaller; or when there is a larger time difference between a current moment and a moment of starting to download the first media file, determining that the length of the $n^{th}$ data block is smaller.

With reference to the first aspect or any one of the possible implementation manners of the first aspect, in a fourth possible implementation manner, after the determining a length of the to-be-downloaded $n^{th}$ data block, the method further includes:

downloading the $n^{th}$ data block according to the determined length of the $n^{th}$ data block.

With reference to the first aspect or any one of the possible implementation manners of the first aspect, in a fifth possible implementation manner, the method further includes:

when the network bandwidth reduction times in the executed first media file downloading process are greater than or equal to the first threshold, stopping downloading the first media file; and determining that a second media file is a to-be-downloaded media file according to second network bandwidth, where the second network bandwidth is network bandwidth when it is determined that the network bandwidth reduction times are greater than or equal to the first threshold; and the second media file is included in a streaming media resource corresponding to the second network bandwidth.

With reference to any one of the possible implementation manners of the first aspect, in a sixth possible implementation manner, the method further includes: when the network bandwidth in the first media file downloading process is periodically detected, determining a detection period in the following manner:

when i−x≥k, determining that $T_{m+1} > T$; or when 0≤i−x<k, determining that $T_{m+1} = T$;

where i is a bandwidth level corresponding to the first network bandwidth, and x is a bandwidth level corresponding to network bandwidth detected at an $m^{th}$ time, where the bandwidth level is an integer, m is an integer greater than or equal to 1, bandwidth corresponding to i is greater than bandwidth corresponding to x, and k is a preset second threshold; and T is a preset detection period, and $T_{m+1}$ is a network bandwidth detection period at an $(m+1)^{th}$ time, where $T_{m+1} = t_{m+1} - t_m$, $t_{m+1}$ is a network bandwidth detection moment at the $(m+1)^{th}$ time, and $t_m$ is a network bandwidth detection moment at the $m^{th}$ time.

With reference to any one of the possible implementation manners of the first aspect, in a seventh possible implementation manner, the method further includes: obtaining the network bandwidth reduction times according to the following rules:

when i−x>0, increasing the network bandwidth reduction times by 1, where i is the bandwidth level corresponding to the first network bandwidth, and x is the bandwidth level corresponding to the network bandwidth detected at the $m^{th}$ time, where the bandwidth level is an integer, m is an integer greater than or equal to 1, and the bandwidth corresponding to i is greater than the bandwidth corresponding to x.

With reference to the sixth possible implementation manner or the seventh possible implementation manner of the first aspect, in an eighth possible implementation manner, the method further includes: determining, in the following manner, a bandwidth level corresponding to a detected network bandwidth:

the streaming media resource includes multiple media files that are respectively corresponding to different bandwidth levels;

each bandwidth level is corresponding to one network bandwidth threshold; and when $W_i \times a \leq W_{detected} < W_{i+1} \times b$, it is determined that the bandwidth level corresponding to the detected network bandwidth is i, where $W_{detected}$ is the detected network bandwidth, $W_i$ is a network bandwidth threshold corresponding to the bandwidth level i, and $W_{i+1}$ is a network bandwidth threshold corresponding to a bandwidth level i+1, where 0<a<1, and 0<b<1.

According to a second aspect, a streaming media resource downloading apparatus is provided, including:

a first determining unit, configured to determine that a first media file is a to-be-downloaded media file according to first network bandwidth, where the first network bandwidth is network bandwidth when it is determined that the first media file is a to-be-downloaded media file; and the first media file is included in a streaming media resource corresponding to the first network bandwidth, and the first media file includes N data blocks, where N≥2, and N is an integer;

a reduction times obtaining unit, configured to obtain network bandwidth reduction times in an executed first media file downloading process; and a second determining unit, configured to: after an $(n-1)^{th}$ data block in the first media file is downloaded, and before an $n^{th}$ data block in the first media file is downloaded, determine a length of the to-be-downloaded $n^{th}$ data block according to the network bandwidth reduction times that are in the executed first media file downloading process and that are obtained by the reduction times obtaining unit, where 1≤n≤N.

In a first possible implementation manner of the second aspect, the apparatus further includes:

a detection unit, configured to periodically detect network bandwidth in the first media file downloading process; and the reduction times obtaining unit is specifically configured to obtain the network bandwidth reduction times in the executed first media file downloading process according to the network bandwidth periodically detected by the detection unit.

With reference to the second aspect or the first possible implementation manner of the second aspect, in a second possible implementation manner, when determining the length of the to-be-downloaded $n^{th}$ data block according to the network bandwidth reduction times that are in the executed first media file downloading process and that are obtained by the reduction times obtaining unit, the second determining unit is specifically configured to:

when the network bandwidth reduction times in the executed first media file downloading process are equal to 0, determine that the length of the to-be-downloaded $n^{th}$ data block is a preset length, where the preset length is corresponding to the first media file;

or when the network bandwidth reduction times in the executed first media file downloading process are greater than 0 and less than a first threshold, determine that the length of the to-be-downloaded $n^{th}$ data block is less than the preset length.

With reference to the second possible implementation manner of the second aspect, in a third possible implementation manner, when the network bandwidth reduction times in the executed first media file downloading process are greater than 0 and less than the first threshold, the second determining unit uses the following rules to determine the length of the to-be-downloaded $n^{th}$ data block:

when there are more network bandwidth reduction times in the executed first media file downloading process, determining that the length of the $n^{th}$ data block is smaller; or when there is a larger time difference between a current moment and a moment of starting to download the first media file, determining that the length of the $n^{th}$ data block is smaller.

With reference to the second aspect or any one of the possible implementation manners of the second aspect, in a fourth possible implementation manner, the apparatus further includes:

a data block downloading unit, configured to: after the second determining unit determines the length of the to-be-downloaded $n^{th}$ data block, download the $n^{th}$ data block according to the length, of the $n^{th}$ data block, determined by the second determining unit.

With reference to the second aspect or any one of the possible implementation manners of the second aspect, in a fifth possible implementation manner, the second determining unit is further configured to: after the $(n-1)^{th}$ data block in the first media file is downloaded, before the $n^{th}$ data block in the first media file is downloaded, and when the network bandwidth reduction times in the executed first media file downloading process are greater than or equal to the first threshold, stop downloading the first media file; and the first determining unit is further configured to determine that a second media file is a to-be-downloaded media file according to second network bandwidth, where the second network bandwidth is network bandwidth when it is determined that the network bandwidth reduction times are greater than or equal to the first threshold; and the second media file is included in a streaming media resource corresponding to the second network bandwidth.

With reference to any one of the possible implementation manners of the second aspect, in a sixth possible implementation manner, the apparatus further includes a period calculation unit, configured to calculate a detection period of periodic network bandwidth detection in the first media file downloading process, and the period calculation unit determines the detection period in the following manner:

when i−x>k, determining that $T_{m+1}$>T; or when 0≤i−x<k, determining that $T_{m+1}$=T;

where i is a bandwidth level corresponding to the first network bandwidth, and x is a bandwidth level corresponding to network bandwidth detected at an $m^{th}$ time, where the bandwidth level is an integer, m is an integer greater than or equal to 1, bandwidth corresponding to i is greater than bandwidth corresponding to x, and k is a preset second threshold; and T is a preset detection period, and $T_{m+1}$ is a network bandwidth detection period at an $(m+1)^{th}$ time, where $T_{m+1}=t_{m+1}-t_m$, $t_{m+1}$ is a network bandwidth detection moment at the $(m+1)^{th}$ time, and $t_m$ is a network bandwidth detection moment at the $m^{th}$ time.

With reference to any one of the possible implementation manners of the second aspect, in a seventh possible implementation manner, when obtaining the network bandwidth reduction times in the executed first media file downloading process, the reduction times obtaining unit obtains the network bandwidth reduction times according to the following rules:

when i−x>0, increasing the network bandwidth reduction times by 1, where i is the bandwidth level corresponding to the first network bandwidth, and x is the bandwidth level corresponding to the network bandwidth detected at the $m^{th}$ time, where the bandwidth level is an integer, m is an integer greater than or equal to 1, and the bandwidth corresponding to i is greater than the bandwidth corresponding to x.

With reference to the sixth or the seventh possible implementation manner of the second aspect, in an eighth possible implementation manner, the apparatus further includes a bandwidth level determining unit, where the bandwidth level determining unit is configured to determine, in the following manner, a bandwidth level corresponding to a network bandwidth detected by the detection unit;

the streaming media resource includes multiple media files that are respectively corresponding to different bandwidth levels;

each bandwidth level is corresponding to one network bandwidth threshold; and when $W_i \times a \leq W_{detected} < W_{i+1} \times b$, it is determined that the bandwidth level corresponding to the detected network bandwidth is i, where $W_{detected}$ is the detected network bandwidth, $W_i$ is a network bandwidth threshold corresponding to the bandwidth level i, and $W_{i+1}$ is a network bandwidth threshold corresponding to a bandwidth level i+1, where 0<a<1, and 0<b<1.

According to a third aspect, a terminal device is provided, including:

a processor;

a data storage apparatus; and a communications interface, where the processor, the data storage apparatus, and the communications interface communicate with each other by using a bus; and the processor reads program code and data that are stored in the data storage apparatus, so as to execute the following operations:

determining that a first media file is a to-be-downloaded media file according to first network bandwidth, where the first network bandwidth is network bandwidth when it is determined that the first media file is a to-be-downloaded media file; and the first media file is included in a streaming media resource corresponding to the first network bandwidth, and the first media file includes N data blocks, where N≤2, and N is an integer; and after an $(n-1)^{th}$ data block in the first media file is downloaded, and before an $n^{th}$ data block in the first media file is downloaded, determining a length of the to-be-downloaded $n^{th}$ data block according to network bandwidth reduction times in an executed first media file downloading process, where 1≤n≤N.

In a first possible implementation manner of the third aspect, the processor further executes the following operations:

periodically detecting network bandwidth in the first media file downloading process; and obtaining the network bandwidth reduction times in the executed first media file downloading process according to the periodically detected network bandwidth.

With reference to the third aspect or the first possible implementation manner of the third aspect, in a second possible implementation manner, when determining the length of the to-be-downloaded $n^{th}$ data block according to the network bandwidth reduction times in the executed first media file downloading process, the processor specifically executes the following operations:

when the network bandwidth reduction times in the executed first media file downloading process are equal to 0, determining that the length of the to-be-downloaded $n^{th}$ data block is a preset length, where the preset length is corresponding to the first media file; or when the network bandwidth reduction times in the executed first media file downloading process are greater than 0 and less than a first threshold, determining that the length of the to-be-downloaded $n^{th}$ data block is less than the preset length.

With reference to the second possible implementation manner of the third aspect, in a third possible implementation manner, when the network bandwidth reduction times in the executed first media file downloading process are greater than 0 and less than the first threshold, the processor uses the following rules to determine the length of the to-be-downloaded $n^{th}$ data block:

when there are more network bandwidth reduction times in the executed first media file downloading process, determining that the length of the $n^{th}$ data block is smaller; or when there is a larger time difference between a current moment and a moment of starting to download the first media file, determining that the length of the $n^{th}$ data block is smaller.

With reference to the third aspect or any one of the possible implementation manners of the third aspect, in a fourth possible implementation manner, after determining the length of the to-be-downloaded $n^{th}$ data block, the processor executes, according to the determined length of the $n^{th}$ data block, an operation of downloading the $n^{th}$ data block.

With reference to the third aspect or any one of the possible implementation manners of the third aspect, in a fifth possible implementation manner, the processor further executes the following operations:

when the network bandwidth reduction times in the executed first media file downloading process are greater than or equal to the first threshold, stopping downloading the first media file; and determining that a second media file is a to-be-downloaded media file according to second network bandwidth, where the second network bandwidth is network bandwidth when it is determined that the network bandwidth reduction times are greater than or equal to the first threshold; and the second media file is included in a streaming media resource corresponding to the second network bandwidth.

With reference to any one of the possible implementation manners of the third aspect, in a sixth possible implementation manner, when periodically detecting the network bandwidth in the first media file downloading process, the processor determines a detection period in the following manner:

when i−x≥k, determining that $T_{m+1}$>T; or
when 0≤i−x<k, determining that $T_{m+1}$=T;

where i is a bandwidth level corresponding to the first network bandwidth, and x is a bandwidth level corresponding to network bandwidth detected at an $m^{th}$ time, where the bandwidth level is an integer, m is an integer greater than or equal to 1, bandwidth corresponding to i is greater than bandwidth corresponding to x, and k is a preset second threshold; and T is a preset detection period, and $T_{m+1}$ is a network bandwidth detection period at an $(m+1)^{th}$ time, where $T_{m+1}=t_{m+1}-t_m$, $t_{m+1}$ is a network bandwidth detection moment at the $(m+1)^{th}$ time, and $t_m$ is a network bandwidth detection moment at the $m^{th}$ time.

With reference to any one of the possible implementation manners of the third aspect, in a seventh possible implementation manner, the processor obtains the network bandwidth reduction times according to the following rules:

when i−x>0, increasing the network bandwidth reduction times by 1, where i is the bandwidth level corresponding to the first network bandwidth, and x is the bandwidth level corresponding to the network bandwidth detected at the $m^{th}$ time, where the bandwidth level is an integer, m is an integer greater than or equal to 1, and the bandwidth corresponding to i is greater than the bandwidth corresponding to x.

With reference to the sixth or the seventh possible implementation manner of the third aspect, in an eighth possible implementation manner, the processor determines, in the following manner, a bandwidth level corresponding to a detected network bandwidth:

the streaming media resource includes multiple media files that are respectively corresponding to different bandwidth levels;

each bandwidth level is corresponding to one network bandwidth threshold; and when $W_i \times a \leq W_{detected} < W_{i+1} \times b$, it is determined that the bandwidth level corresponding to the detected network bandwidth is i, where $W_{detected}$ is the detected network bandwidth, $W_i$ is a network bandwidth threshold corresponding to the bandwidth level i, and $W_{i+1}$ is a network bandwidth threshold corresponding to a bandwidth level i+1, where 0<a<1, and 0<b<1.

In the embodiments of the present invention, after it is determined that a first media file is a to-be-downloaded media file, when the first media file is divided into blocks for downloading, a length of a to-be-downloaded data block is determined according to network bandwidth reduction times in a first media file downloading process, so as to adapt to reduced network bandwidth, so that streaming media playing can better adapt to a network bandwidth change, streaming media resource switching times are reduced, and video playing is smooth.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

It should be understood that, when ordinal numbers such as "first" and "second" are mentioned in the embodiments of the present invention, they are merely used for distinguishing unless they definitely show a sequence according to a context.

A streaming media resource downloading method provided in the embodiments of the present invention mainly refers to streaming media resource downloading based on an HLS live streaming transfer protocol. A streaming media resource mentioned in the embodiments of the present invention generally refers to any file related to an HLS transfer file, and may be a general name of all files, or may be any one of transfer files.

Figure 1:
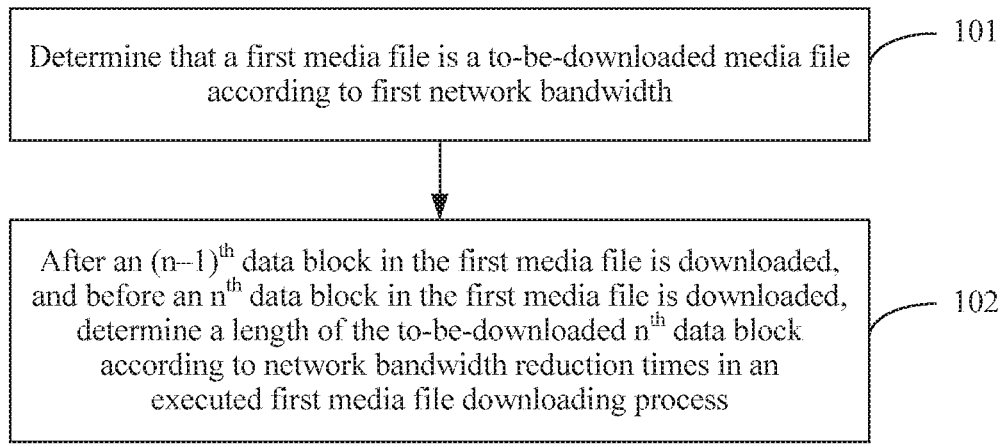
FIG. 1 is a flowchart of a streaming media resource downloading method according to an embodiment of the present invention.

FIG. 1 is a flowchart of a streaming media resource downloading method according to an embodiment of the present invention. As shown in FIG. 1, the method includes the following steps.

Step 101: Determine that a first media file is a to-be-downloaded media file according to first network bandwidth.

In this embodiment of the present invention, when preparing to download a streaming media resource, a terminal device may obtain current network bandwidth, that is, the first network bandwidth. That is, the first network bandwidth is network bandwidth when it is determined that the first media file is a to-be-downloaded media file. Then the terminal device may obtain a bandwidth level and an index value that are of a streaming media resource corresponding to the first network bandwidth, and determine that the first media file in the streaming media resource is a to-be-downloaded media file. The first media file is included in the streaming media resource corresponding to the first network bandwidth, and the first media file includes N data blocks, where N≥2, and N is an integer.

Generally, a streaming media resource file includes an index file and an MPEG2-TS (Moving Picture Experts Group 2-Transport Stream, Moving Picture Experts Group 2-Transport Stream, TS or MTS for short) media file. A TS is a standard format for transmission and storage of various data including sound effect, a video, and a communications protocol, and is used in a digital video broadcasting system. The index file includes multiple sub-index files, and conditions for downloading and playing a streaming media resource are stipulated in each sub-index file, such as BANDWIDTH (bandwidth), RESOLUTION (resolution), and a file name. Each streaming media resource includes multiple TS media files, and these TS media files are consecutive in terms of time to form one complete streaming media resource. In addition, each TS media file includes multiple data blocks. It may be understood that each streaming media resource is downloaded in a unit of a TS media file, and each TS media file is downloaded in a unit of a data block. The TS media file is the foregoing first media file.

The TS media file described in this embodiment of the present invention includes at least two data blocks, and during downloading of the TS media file, the data blocks are successively downloaded, instead of entirely downloading the TS media file. Lengths of the multiple data blocks may be fixed, or may be changeable. The lengths of the multiple data blocks may be equal, or may be unequal.

An index file of a streaming media resource includes multiple sub-index files that may be in the following format, for example. The following lists only one sub-index file to represent a general format of all sub-index files:

EXT-X-STREAM-INF: PROGRAM-ID=?, BANDWIDTH=?, RESOLUTION=?, CODECS="?"

i.m3u8 where #EXT-X-STREAM-INF is an attribute information flag bit of a streaming media resource that is represented by a sub-index file; PROGRAM-ID refers to an identifier of the streaming media resource, and is used to represent a same type of resources of different encoding formats; BANDWIDTH refers to a network bandwidth threshold suitable for playing the streaming media resource, and a unit is bit/s; RESOLUTION refers to resolution; CODECS refers to a type and a format of the streaming media resource; i.m3u8 is a file name of the sub-index file, where i is an integer greater than or equal to 0 and represents an index value and a bandwidth level of the sub-index file, and larger i indicates a larger index value, a higher bandwidth level, and larger bandwidth.

When preparing to download a streaming media resource, the terminal device may obtain the first network bandwidth by using a bandwidth estimation method, for example.

For example, the bandwidth estimation method is:

recording a length and a time of a downloaded data block during each HTTP connection before a current moment, and storing latest multiple downloading records before the current time, for example, 100 records, and entering lengths and times of downloaded data blocks in the latest 100 records to formula 1, to obtain first network bandwidth $W_1$:

$$W_1=(B_1+B_2+\ldots+B_n)\times 8\times 1000/(T_1+T_2+\ldots+T_n)$$
(bit/s)      Formula 1 where $B_n$ is a length of a downloaded data block in an $n^{th}$ record, and a unit is KB; and $T_n$ is a time taken to download the data block in the $n^{th}$ record, and a unit is ms, where $2 \le n \le 100$.

The first network bandwidth $W_1$ is compared with a network bandwidth threshold of each sub-index file, so as to determine a streaming media resource which the first network bandwidth $W_1$ is suitable for playing, and a bandwidth level of a sub-index file corresponding to the first network bandwidth $W_1$.

A determining method may use the following manner:

When $BANDWIDTH_i \le BANDWIDTH_{i+1}$, it is determined that the first network bandwidth $W_1$ is suitable for downloading a streaming media resource corresponding to $BANDWIDTH_i$, and a bandwidth level of the streaming media resource corresponding to $W_1$ is i; or when $BANDWIDTH_i$ is a maximum value in network bandwidth thresholds of all sub-index files, if $W_1 \ge BANDWIDTH_i$, it is determined that the first network bandwidth $W_1$ is suitable for downloading a streaming media resource corresponding to $BANDWIDTH_i$, and a bandwidth level of the streaming media resource corresponding to $W_1$ is i, where $BANDWIDTH_i$ is a network bandwidth threshold of a sub-index file whose index value is i.

A streaming media resource whose index value is i includes multiple TS media files, and each TS media file includes at least two data blocks. When determining that the first network bandwidth $W_1$ is corresponding to the streaming media resource whose index value is i, the terminal device determines that in the streaming media resource, a TS media file whose index value is i, that is, the first media file, is a to-be-downloaded media file, and prepares to download the first media file. It should be noted that in the streaming media resource, there are multiple TS media files whose index values are i, and in a specific implementation process, one suitable to-be-downloaded TS media file may be selected from the multiple TS media files according to an existing mechanism.

Step 102: After an $(n-1)^{th}$ data block in the first media file is downloaded, and before an $n^{th}$ data block in the first media file is downloaded, determine a length of the to-be-downloaded $n^{th}$ data block according to network bandwidth reduction times in an executed first media file downloading process, where $1 \le n \le N$.

In a process of downloading the first media file by dividing the first media file into multiple data blocks, the terminal device may adjust a length of a to-be-downloaded data block according to a network bandwidth change.

It should be noted that each first media file may be corresponding to one preset length of a data block. For example, when the preset length, of the data block, corresponding to the first media file is L1, during downloading of the first media file, the first media file is divided into multiple data blocks with a length of L1 by default for downloading. Then in a downloading process, a length of a to-be-downloaded data block may be adjusted according to a network bandwidth change. The preset length, of the data block, corresponding to the first media file is related to a network bandwidth threshold corresponding to the first media file (that is, the preset length, of the data block, corresponding to the first media file is related to an index value corresponding to the first media file), and a higher network bandwidth threshold corresponding to the first media file (that is, a larger index value corresponding to the first media file) indicates a greater preset length, of the data block, corresponding to the first media file.

After it is determined that the first media file is a to-be-downloaded media file, a preset length is used to start to download the first data block in the first media file, that is, a length of the first data block is the preset length. During downloading of the first data block, network bandwidth reduction times do not need to be determined; or it may be understood as follows: Before the first data block is downloaded, obtained network bandwidth reduction times are 0, and in this case, it is determined that the length of the to-be-downloaded first data block is the preset length. It should be noted that when the length of the first data block is determined, n=1, and in this case, the $(n-1)^{th}$ data block is a $0^{th}$ data block, and the $0^{th}$ data block is empty and does not include any content.

When it is determined that the first media file in the streaming media resource whose index value is i is a to-be-downloaded media file according to step 101, the preset length, of the data block, corresponding to the first media file may be obtained according to a network bandwidth threshold of a sub-index file whose index value is i.

For example, the preset length of the data block may be obtained by using formula 2:

$$P_i = \text{Log}_2(\text{BANDWIDTH}_i/\text{BANDWIDTH}_{min}) \times 10240 \qquad \text{Formula 2}$$

where $P_i$ is the preset length, of the data block, corresponding to the first media file whose index value is i, and $P_{min} \leq P_i \leq P_{max}$, where $P_{min}$ is a minimum value of the preset length, $P_{max}$ is a maximum value of the preset length, and $P_{min}$ and $P_{max}$ may be determined according to an actual situation. For example, $P_{min}=10240$, and $P_{max}=655360$. $\text{BANDWIDTH}_{min}$ is a minimum value in network bandwidth thresholds of all sub-index files.

When it is determined that the streaming media resource whose index value is i is corresponding to the first network bandwidth $W_1$, the first data block in the first media file in the streaming media resource starts to be downloaded by using $P_i$ as the preset length.

Before any another data block in the first media file is downloaded, a length of a to-be-downloaded data block is determined according to the network bandwidth reduction times in the executed first media file downloading process. For example, after the $(n-1)^{th}$ data block in the first media file is downloaded, and before the $n^{th}$ data block in the first media file is downloaded, the length of the to-be-downloaded $n^{th}$ data block is determined according to the network bandwidth reduction times in the executed first media file downloading process. The executed first media file downloading process is a process of downloading (n-1) data blocks in the first media file, where the (n-1) data blocks may be a $0^{th}$ data block, a first data block, a second block, ..., and the $(n-1)^{th}$ data block.

The length of the $n^{th}$ data block is determined according to the network bandwidth reduction times in the first media file downloading process, and the determined length may be equal to the preset length of the data block or less than the preset length of the data block, so that media file downloading can adapt to a requirement, of reduced network bandwidth, on a length of a to-be-downloaded data block.

In the first media file downloading process, network bandwidth may change within a large range or frequently fluctuate. When the network bandwidth is reduced, a data volume that can be downloaded in a specific time is reduced with relatively low network bandwidth. If the preset length is still used to download a data block, a downloading speed decreases, and downloading may even stop because the network bandwidth constantly decreases. If the media file is directly switched, according to reduced network bandwidth, to a new media file for downloading, inaccurate resource switching is caused because of inaccurate network bandwidth detection. In addition, frequent network bandwidth fluctuation causes frequent resource switching, causing a resource waste.

In this embodiment of the present invention, after it is determined that a first media file is a to-be-downloaded media file, the first media file is divided into blocks for downloading. Before any data block in the first media file is downloaded, a length of a to-be-downloaded data block is determined according to network bandwidth reduction times in an executed first media file downloading process. Therefore, the length of the to-be-downloaded data block adapts to reduced network bandwidth, times of downloading resource switching can be reduced, and video playing is smooth.

Figure 2:
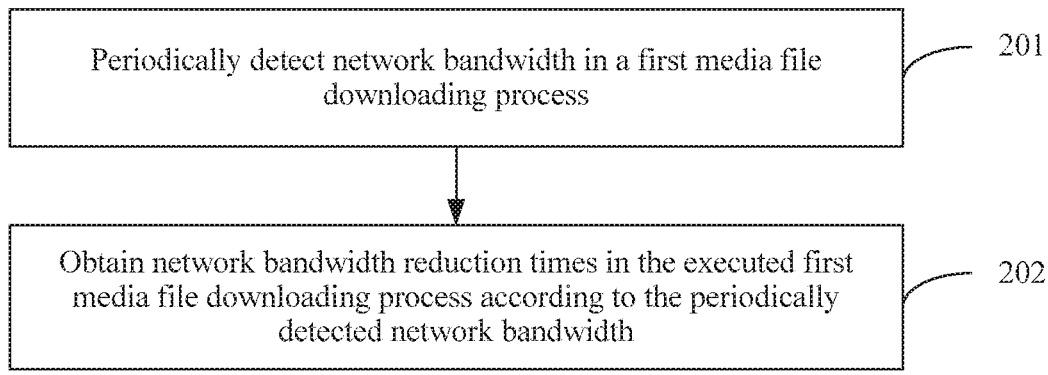
FIG. 2 is a flowchart of a method for obtaining network bandwidth reduction times according to an embodiment of the present invention.

FIG. 2 is a flowchart of a method for obtaining network bandwidth reduction times according to an embodiment of the present invention. The method is used to obtain the network bandwidth reduction times in the executed first media file downloading process in the embodiment shown in FIG. 1.

As shown in FIG. 2, the method includes the following steps.

Step 201: Periodically detect network bandwidth in a first media file downloading process.

In the first media file downloading process, a terminal device constantly and periodically detects the network bandwidth to obtain detected network bandwidth.

It should be noted that a period mentioned in this embodiment of the present invention is a time difference between two adjacent network bandwidth detection moments, and the period is adjustable and is not fixed. Both a period and a time point of executing network bandwidth detection are unrelated to a to-be-downloaded data block, and downloading moments in the first media file downloading process are used as an executing basis.

For example, a detection period of periodic detection may be determined in the following manner:

The detection period of periodic network bandwidth detection is preset to $T_{preset}$, and after downloading of the first media file starts, a period of executing network bandwidth detection for the first time is $T_{preset}$, that is, network bandwidth detection is executed for the first time when a time difference between a moment of starting to download the first media file and a current time is $T_{preset}$.

Detected network bandwidth obtained by executing periodic network bandwidth detection is $W_{detected}$, and it is determined, according to the method of determining the bandwidth level, of the sub-index file, corresponding to the first network bandwidth $W_1$ in step 101, that $W_{detected}$ is corresponding to a bandwidth level of a sub-index file whose index value is x. In addition, if it is learned that the first network bandwidth $W_1$ obtained when the to-be-downloaded first media file is determined is corresponding to the bandwidth level of the sub-index file whose index value is i, determining is performed on a relationship between the index value i and the index value x.

A larger index value indicates higher network bandwidth corresponding to the index value; and a threshold k of a difference value of index values, that is, a preset second threshold, is greater than 0. When $i-x \geq k$, it indicates that the detected network bandwidth $W_{detected}$ obtained by means of periodic detection is reduced relative to the first network bandwidth $W_1$, and the detection period of periodic network bandwidth detection may be increased, that is, a period of executing network bandwidth detection for the next time $T_{n+1} > T_{preset}$; or if i−x<k, it indicates that the detected network bandwidth $W_{detected}$ obtained by means of periodic detection is not reduced relative to the first network bandwidth $W_1$, and the detection period of periodic network bandwidth detection does not change, that is, a period of executing network bandwidth detection for the next time $T_{n+1} = T_{preset}$.

The terminal device adjusts the detection period of periodic network bandwidth detection in the first media file downloading process according to an index value of the periodically detected network bandwidth, and executes a next time of network bandwidth detection in an adjusted detection period of periodic network bandwidth detection to obtain periodically detected network bandwidth.

Step 202: Obtain network bandwidth reduction times in the executed first media file downloading process according to the periodically detected network bandwidth.

The detected network bandwidth $W_{detected}$ is obtained by periodically detecting the network bandwidth in the first media file downloading process according to step 201. The detected network bandwidth $W_{detected}$ is corresponding to the bandwidth level of the sub-index file whose index value is x, and the first network bandwidth $W_1$ is corresponding to the bandwidth level of the sub-index file whose index value is i. If i>x, that is, if the detected network bandwidth is reduced compared with the first network bandwidth, the network bandwidth reduction times in the first media file downloading process are increased by 1.

In the first media file downloading process, each time periodic network bandwidth detection is executed, whether the detected network bandwidth is reduced is determined according to the periodically detected network bandwidth $W_{detected}$, and detected reduction times are accumulated in the network bandwidth reduction times in the first media file downloading process.

In the first media file downloading process, the network bandwidth may change within a large range or frequently fluctuate, and the detected network bandwidth may be lower or higher than actual network bandwidth. Consequently, the terminal device inaccurately switches a to-be-downloaded file according to an inaccurate network bandwidth detection value.

In this embodiment of the present invention, when network bandwidth detection is periodically executed, and a difference between a bandwidth level of periodically detected network bandwidth and a bandwidth level of a first network bandwidth exceeds a specific threshold, that is, when it is determined that in a first media file downloading process, changing of the network bandwidth reaches a specific degree, a detection period is accordingly increased. Therefore, a network bandwidth value close to an actual value can be obtained by extending the detection period, so that a difference of a network bandwidth estimation result is reduced, and an estimation result of detected network bandwidth is more accurate.

It should be noted that in this embodiment of the present invention, when the detection period in periodic detection is determined in step 201, and the network bandwidth reduction times in the executed first media file downloading process are obtained in step 202, the bandwidth level of the periodically detected network bandwidth needs to be determined.

In this embodiment of the present invention, a method for determining the bandwidth level of the periodically detected network bandwidth may use the method for determining the bandwidth level, of the sub-index file, corresponding to the first network bandwidth provided in step 101, or the following method may be used to replace the method for determining the bandwidth level in step 101.

In this embodiment of the present invention, for example, a network bandwidth threshold of each sub-index file of a streaming media resource may be adjusted to a specific degree, so as to buffer a switch point of the streaming media resource when network bandwidth is periodically detected in a first media file downloading process. In addition, a higher bandwidth level indicates a larger adjustment degree of a network bandwidth threshold.

A streaming media resource includes multiple streaming media resources having different network bandwidth thresholds. A network bandwidth threshold is included in a sub-index file of a streaming media resource, and is corresponding to a bandwidth level of the streaming media resource. When $W_i \times a \leq W_{detected} < W_{i+1} \times b$, it is determined that the bandwidth level corresponding to the detected network bandwidth $W_{detected}$ is i. It may be understood that when $W_i$ is a maximum value of the network bandwidth thresholds, $W_{i+1}$ may be equal to infinity. Therefore, provided that $W_{detected} > W_i \times a$, it may be determined that the bandwidth level corresponding to the detected network bandwidth is i. $W_i$ is a network bandwidth threshold corresponding to the bandwidth level i, and $W_{i+1}$ is a network bandwidth threshold corresponding to a bandwidth level i+1, where 0<a<1, and 0<b<1.

In this embodiment of the present invention, for example, formula 3 may be used to adjust the network bandwidth threshold of each sub-index file of the streaming media resource:

$$\text{BANDWIDTH}_{xadjusted} = \text{BANDWIDTH}_x \times (1 - \log_2(\text{BANDWIDTH}_x / \text{BANDWIDTH}_{min}) \times 0.05) \quad \text{Formula 3}$$

where $\text{BANDWIDTH}_{xadjusted}$ is a value obtained after $\text{BANDWIDTH}_x$ is adjusted, and a unit is bit/s.

Further, the bandwidth level of the detected network bandwidth $W_{detected}$ obtained by means of periodic detection is determined by using the method for determining the bandwidth level, of the sub-index file, corresponding to the first network bandwidth $W_1$ in step 101.

When $\text{BANDWIDTH}_{xadjusted} \leq W_{detected} < \text{BANDWIDTH}_{x+1ajdusted}$, it is determined that the detected network bandwidth $W_{detected}$ is suitable for downloading a streaming media resource corresponding to $\text{BANDWIDTH}_{xadjusted}$, and a bandwidth level, of a streaming media resource, corresponding to $W_{detected}$ is x; or when $\text{BANDWIDTH}_{xadjusted}$ is a maximum value of network bandwidth thresholds of all sub-index files, if $W_{detected} \geq \text{BANDWIDTH}_{xadjusted}$, it is determined that the detected network bandwidth $W_{detected}$ is suitable for downloading a streaming media resource corresponding to $\text{BANDWIDTH}_{xadjusted}$, and a bandwidth level, of a resource, corresponding to $W_{detected}$ is x, where $\text{BANDWIDTH}_{xadjusted}$ is a network bandwidth threshold of a sub-index file whose index value is x.

When it is determined that the bandwidth level corresponding to $W_{detected}$ is x, the network bandwidth reduction times in the executed first media file downloading process may be further obtained according to the method in step 202.

The first network bandwidth level i is compared with the bandwidth level x corresponding to the detected network bandwidth $W_{detected}$. If i>x, the network bandwidth reduction times in the first media file downloading process are increased by 1, and the network bandwidth reduction times in the first media file downloading process are accumulated.

A network bandwidth threshold of each streaming media resource is downward adjusted. Therefore, when a reduction degree of detected network bandwidth is not high, a streaming media resource which the detected network bandwidth is suitable for playing is still a streaming media resource being downloaded. Therefore, the streaming media resource matching the detected network bandwidth is not directly switched when the detected network bandwidth is reduced. Therefore, a switch point of the streaming media resource is buffered, accuracy of streaming media resource switching is improved, and switching times are reduced.

Figure 3:
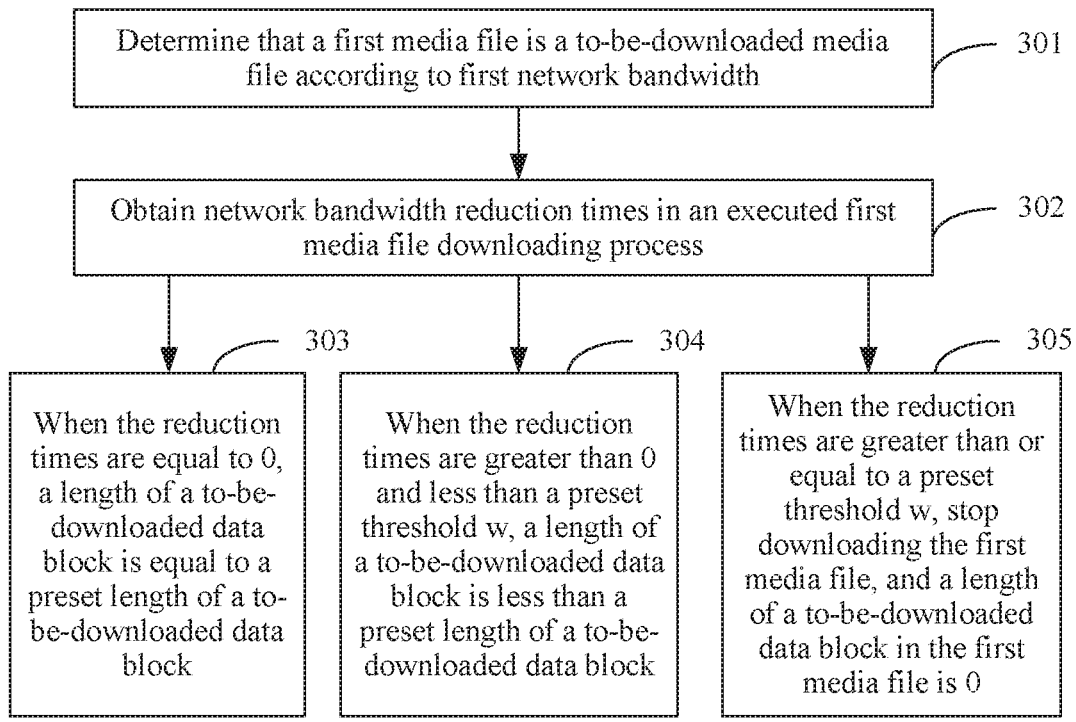
FIG. 3 is a flowchart of another streaming media resource downloading method according to an embodiment of the present invention.

FIG. 3 is a flowchart of another streaming media resource downloading method according to an embodiment of the present invention.

The method includes the following steps.

Step 301: Determine that a first media file is a to-be-downloaded media file according to first network bandwidth. Step 301 is the same as step 101 in the embodiment shown in FIG. 1, and details are not described herein again.

Step 302: After an $(n-1)^{th}$ data block in the first media file is downloaded, and before an $n^{th}$ data block in the first media file is downloaded, obtain network bandwidth reduction times in an executed first media file downloading process.

The network bandwidth reduction times in the executed first media file downloading process may be obtained by using the method in step 202 in the embodiment shown in FIG. 2.

After the reduction times are obtained in step 302, a length of a to-be-downloaded data block is determined according to the reduction times. Specifically, step 303, step 304, or step 305 may be executed according to the reduction times after step 302.

Step 303: When the network bandwidth reduction times in the executed first media file downloading process are equal to 0, determine that a length of the to-be-downloaded $n^{th}$ data block is equal to a preset length, and start to download the $n^{th}$ data block according to the determined preset length of the to-be-downloaded $n^{th}$ data block. The preset length is obtained by using the method in step 102, and the length is determined according to a network bandwidth threshold of a sub-index file in a streaming media resource in which the first media file is located.

Step 304: When the network bandwidth reduction times in the executed first media file downloading process are greater than 0 and less than a preset threshold w, determine that a length of the to-be-downloaded $n^{th}$ data block is less than a preset length, and download the $n^{th}$ data block by using a reduced length of the data block.

The reduced length of the data block is determined by the network bandwidth reduction times in the executed first media file downloading process, and more reduction times indicate a smaller length of the to-be-downloaded $n^{th}$ data block. Alternatively, the reduced length of the data block is determined by a time difference between a current moment to a moment of starting to download the first media file, and a larger time difference indicates a smaller length of the to-be-downloaded $n^{th}$ data block.

For example, when the reduction times are 1, the reduced length of the data block is $P_i/(1+1)$ or $P_i/(1+2)$; or when the time difference between the current moment and the moment of starting to download the first media file is two seconds, the reduced length of the data block is $P_i/2$ or $P_i/(2+1)$.

Step 305: When the network bandwidth reduction times in the executed first media file downloading process are greater than or equal to a preset threshold w, stop downloading the first media file, and determine that a length of a to-be-downloaded data block in the first media file is 0.

It should be noted that after it is determined that the length of the to-be-downloaded data block in the first media file is 0 in step 305, it indicates that the first media file is no longer downloaded.

Further, the method provided in this embodiment of the present invention may further include the following steps a1, a2, and a3.

Step a1: Determine that a second media file is a to-be-downloaded media file according to second network bandwidth, where the second network bandwidth is network bandwidth when it is determined that the network bandwidth reduction times are greater than or equal to the preset threshold w; and the second media file is included in a streaming media resource corresponding to the second network bandwidth.

It should be noted that the method for determining that the first media file is a to-be-downloaded media file in the embodiment shown in FIG. 1 may be used to determine that the second media file is a to-be-downloaded media file.

Step a2: After an $(n-1)^{th}$ data block in the second media file is downloaded, and before an $n^{th}$ data block in the second media file is downloaded, determine a length of the to-be-downloaded $n^{th}$ data block according to network bandwidth reduction times in an executed second media file downloading process, where $1 \leq n \leq N$.

In the second media file downloading process, a method same as that for downloading the first media file is used for downloading. For the method for downloading the first media file, refer to the foregoing embodiments.

Step a3: Download the $n^{th}$ data block in the second media file according to the determined length of the to-be-downloaded $n^{th}$ data block, or determine that another media file is a to-be-downloaded media file, and start to download the another media file.

It should be noted that during downloading of any media file, reference may be made to the foregoing method for downloading the first media file.

The foregoing method provided in this embodiment of the present invention is a downloading method used when network bandwidth is reduced in a streaming media resource downloading process. Data block downloading with relatively small bandwidth is not affected when network bandwidth increases. Therefore, when the network bandwidth increases, an existing manner may be used. For example, after a first media file in a streaming media resource is downloaded, the first media file is directly switched to a second media file in another streaming media resource that is corresponding to a current network bandwidth level for downloading, or another method well known by a person skilled in the art may be used for downloading a streaming media resource when network bandwidth increases. Certainly, in a network bandwidth increase process, a method similar to step 303, 304, or 305 may be used. As the network bandwidth increases, a length of a data block is increased to adapt to a network bandwidth change.

When network bandwidth changes within a large range or frequently fluctuates, a network bandwidth detection result obtained by using a network bandwidth estimation method has a large error, and consequently, a media file being downloaded needs to be frequently switched. In this embodiment of the present invention, a length of a to-be-downloaded data block in a first media file is adjusted according to network bandwidth reduction times in an executed first media file downloading process, so that the length of the to-be-downloaded data block better adapts to network bandwidth reduction. This avoids a resource waste caused by inaccurate switching of the first media file being downloaded because of an inaccurate network bandwidth detection result.

The following gives a specific example for better understanding the foregoing implementation manners of the present invention.

An M3U8 index file of a streaming media resource is as follows:

EXTM3U
EXT-X-STREAM-INF:PROGRAM-ID=1,BANDWIDTH=55648,CODECS="mp 4a.40.5"
00.m3u8
EXT-X-STREAM-INF:PROGRAM-ID=1,BANDWIDTH=120320,RESOLUTION=176×144, CODECS="avc1.42e00a,mp4a.40.5"
01.m3u8
EXT-X-STREAM-INF:PROGRAM-ID=1,BANDWIDTH=294784,RESOLUTION=320×180, CODECS="avc1.42e00d,mp4a.40.5"
02.m3u8
EXT-X-STREAM-INF:PROGRAM-ID=1,BANDWIDTH=511360,RESOLUTION=400×224, CODECS="avc1.4d4015,mp4a.40.5"
03.m3u8
EXT-X-STREAM-INF:PROGRAM-ID=1,BANDWIDTH=809152, RESOLUTION=480×270, CODECS="avc1.4d4015,mp4a.40.5"
04.m3u8
EXT-X-STREAM-INF:PROGRAM-ID=1,BANDWIDTH=1343072, RESOLUTION=640×360, CODECS="avc1.4d401e,mp4a.40.5"
05.m3u8 where #EXTM3U is a flag bit of the m3u8 file; #EXT-X-STREAM-INF is an attribute information flag bit of a streaming media resource that is represented by the sub-index file; PROGRAM-ID refers to an identifier of the streaming media resource, and represents a same type of resources of different encoding formats; BANDWIDTH refers to a network bandwidth threshold suitable for playing the streaming media resource, and a unit is bit/s; RESOLUTION refers to resolution; CODECS refers to a type and a format of the streaming media resource; i.m3u8 is a file name of the sub-index file, where i is an integer greater than or equal to 0 and represents an index value and a bandwidth level of the sub-index file, and larger i indicates a larger index value, a higher bandwidth level, and larger bandwidth.

For example, a method for downloading the streaming media resource may include the following steps.

Step 1: Process a network bandwidth threshold of each sub-index file to obtain a preset length, of a data block, corresponding to a TS media file of each streaming media resource.

For example, normalization processing may be performed on the bandwidth thresholds of all the sub-index files to obtain the preset length of the data block. Calculation according to a sequence of index values of the sub-index files is as follows:

$P_0 = \log_2 (55648/55648) \times 10240 = 0$
$P_1 = \log_2 (120320/55648) \times 10240 = 11391$
$P_2 = \log_2 (294784/55648) \times 10240 = 24629$
$P_3 = \log_2 (511360/55648) \times 10240 = 33879$
$P_4 = \log_2 (809152/55648) \times 10240 = 39546$
$P_5 = \log_2 (1343072/55648) \times 10240 = 47032$ The foregoing results are results obtained after rounding processing, and a unit is byte (Byte).

In this embodiment of the present invention, a value range is limited for the preset length $P_i$ of the data block, the preset length has a maximum value and a minimum value, and $10240 \leq P_i \leq 65536$. That is, when $P_i$ obtained by calculation is less than 10240, $P_i$ is always determined as 10240; or when $P_i$ obtained by calculation is greater than 65536, $P_i$ is always determined as 65536. Therefore, in the foregoing results, only $P_0$ needs to be processed, so that $P_0=10240$, and all other values are obtained after the calculation results are rounded. Therefore, the preset lengths of the data blocks of all the sub-index files are respectively {10240, 11391, 24629, 33879, 39546, 47032}, corresponding network bandwidth is respectively {55648, 120320, 294784, 511360, 809152, 1343072}, and corresponding index values and bandwidth levels are respectively {0, 1, 2, 3, 4, 5}.

For example, when detected network bandwidth $W_{detected}=150000$, which is greater than 120320 bit/s and less than 294784 bit/s, an index value and a bandwidth level of a streaming media resource corresponding to the detected network bandwidth are 1, and a preset length of a to-be-downloaded data block is 11391 Bytes.

Step 2: Determine that a first media file is a to-be-downloaded media file according to first network bandwidth.

When a streaming media resource is to be downloaded, first network bandwidth $W_1$ is obtained according to a bandwidth estimation method. In this embodiment of the present invention, it is assumed that the obtained first network bandwidth $W_1=1400000$ bit/s. $W_1$ is compared with network bandwidth thresholds of all sub-index files. $W_1$ is greater than a network bandwidth threshold 1343072 whose index value is 5, and the network bandwidth threshold 1343072 whose index value is 5 is a maximum value in all the sub-index files. Therefore, it is determined that a first media file in a streaming media resource whose index value is 5 is a to-be-downloaded media file according to the first network bandwidth $W_1$, and according to a processing result in step 1, a preset length 47032 KBs, of a data block, corresponding to the index value 5 is used to start to download the first media file. It is recorded that a time of starting to download the first media file is 08:00:00.000 (which is updated when a new media file is downloaded), and may have a precision of millisecond.

Step 3: Periodically detect network bandwidth in a first media file downloading process, and adjust a detection period of periodic network bandwidth detection.

Starting from completion of downloading of the first data block in the first media file, when there is still a data block that has not been downloaded in the first media file, whether to execute periodic network bandwidth detection is determined.

A time difference between a current moment and a last moment of executing periodic bandwidth detection is detected, and whether the foregoing time difference is greater than or equal to the detection period is determined. When there is no action of executing the last time of periodic bandwidth detection, that is, no bandwidth detection is ever executed in the first media file downloading process, a time difference between a current moment and a moment of starting to download the first media file is obtained. When the time difference is greater than or equal to the detection period, periodic network bandwidth detection is executed.

It should be noted that the network bandwidth detection period may have a preset value. In the first media file downloading process, the detection period may be adjusted according to a network bandwidth change.

The following uses an example to describe detection period adjustment.

For example, the network bandwidth detection period is preset to T seconds. In the executed first media file downloading process, if the network bandwidth is reduced at a last time of executing periodic network bandwidth detection, and a bandwidth level difference i−x between a bandwidth level i of the last time of periodic network bandwidth detection and a bandwidth level x of the first network bandwidth $W_1$ is greater than T, the bandwidth level difference (i−x) seconds is used as a detection period; or if i−x is less than or equal to T, the preset T is still used as the detection period.

For example, in the first media file downloading process, periodic network bandwidth detection has been executed. During periodic detection that just ends, the network bandwidth is reduced, a bandwidth level difference between a bandwidth level of reduced network bandwidth and the bandwidth level of the first network bandwidth is 2, and a preset detection period is one second. In this case, the bandwidth level difference two seconds is used as a detection period for periodic network bandwidth detection. That is, when a time difference between a moment at which periodic network bandwidth detection just ends and a current moment is two seconds, periodic network bandwidth detection at a current time is executed, and is unrelated to a to-be-downloaded data block.

In the first media file downloading process, if periodic network bandwidth detection is never executed, or periodic detection is executed, but it is detected that a difference between a bandwidth level of reduced network bandwidth and the level of the first network bandwidth is less than a preset period one second, the preset detection period one second is used as the detection period for periodic network bandwidth detection.

Step 4: Obtain network bandwidth reduction times in the first media file downloading process according to a periodic network bandwidth detection result.

In a periodic network bandwidth detection process, network bandwidth thresholds of all sub-index files may be directly used as a basis for determining a bandwidth level corresponding to a periodically detected network bandwidth, so as to obtain the network bandwidth reduction times.

Optionally, adjusted network bandwidth thresholds of all sub-index files may be used as a basis for determining a bandwidth level corresponding to a periodically detected network bandwidth, so as to obtain the network bandwidth reduction times.

The following uses an example for description of using the adjusted network bandwidth thresholds of all the sub-index files as a basis. Adjustment to the network bandwidth thresholds of all the sub-index files is as follows, and a unit of an adjusted $BANDWIDTH_{adjusted}$ is bits/s.

$BANDWIDTH_{0adjusted}$=55648×(1−log$_2$(55648/55648)× 0.05)=55648

$BANDWIDTH_{1adjusted}$=120320×(1−log$_2$(120320/ 55648)×0.05)=113100

$BANDWIDTH_{2adjusted}$=294784×(1−log$_2$(294784/ 55648)×0.05)=259409

$BANDWIDTH_{3adjusted}$=511360×(1−log$_2$(511360/ 55648)×0.05)=429542

$BANDWIDTH_{4adjusted}$=809152×(1−log$_2$(809152/ 55648)×0.05)=655413

$BANDWIDTH_{5adjusted}$=1343072×(1−log$_2$(1343072/ 55648)×0.05)=1034 165

The adjusted network bandwidth is respectively {55648, 113100, 259409, 429542, 655413, 1034165}, corresponding network bandwidth is respectively {55648, 120320, 294784, 511360, 809152, 1343072}, and corresponding index values and bandwidth levels are respectively {0, 1, 2, 3, 4, 5}.

When the detected network bandwidth $W_{detected}$=450000 bits/s, $W_{detected}$ is compared with the adjusted network bandwidth. $W_{detected}$ is greater than the adjusted network bandwidth threshold 425942 whose index value is 3, and $W_{detected}$ is less than the adjusted network bandwidth threshold 655413 whose index value is 4. In this case, $BANDWIDTH_{3adjusted}$<$W_{detected}$<$BANDWIDTH_{4adjusted}$. Therefore, the periodically detected network bandwidth $W_{detected}$ is corresponding to a streaming media resource whose index value is 3.

The index value 5 corresponding to the first network bandwidth $W_1$ is compared with the index value 3 corresponding to the periodically detected network bandwidth $W_{detected}$. It can be learned that the periodically detected network bandwidth $W_{detected}$ is reduced compared with the first network bandwidth $W_1$. Therefore, a difference value of the index values is recorded as 2, the network bandwidth reduction times in the first media file downloading process are increased by 1, and the network bandwidth reduction times in the first media file downloading process are accumulated.

Step 5: After an $(n-1)^{th}$ data block is downloaded, and before an $n^{th}$ data block is downloaded, determine a length of the to-be-downloaded $n^{th}$ data block according to the network bandwidth reduction times that are in the first media file downloading process and that are obtained in step 4, and start corresponding downloading.

If the reduction times obtained in step 4 are equal to 0, that is, network bandwidth is not reduced in a process of downloading the first n−1 data blocks in the first media file, it is determined that the length of the to-be-downloaded $n^{th}$ data block is the preset length 47032 KBs, and the first media file continues to be downloaded.

If the reduction times obtained in step 4 are 2, and a preset threshold is 3, the reduction times are less than the preset threshold 3. That is, in the process of downloading the first n−1 data blocks in the first media file, when the network bandwidth is reduced for two times, it may be determined that the length of the to-be-downloaded data block is 47032/ $2_{(times)}$ KBs or 47032/($2_{(times)}$+1) KBs according to the two reduction times; or it is determined that the length of the to-be-downloaded data block is 47032/2 KBs according to a time difference 2 between a time 08:00:02.020 to download the $n^{th}$ data block and the time 08:00:00.000 of starting to download the first media file. A terminal device may select, according to an actual requirement, a determined length of the data block from the foregoing results to start to download the $n^{th}$ data block. If the reduction times obtained in step 4 are 3 that is greater than or equal to the preset threshold 3, that is, in the process of downloading the first n−1 data blocks in the first media file, when the network bandwidth is reduced for three times, it is excluded that network bandwidth detection is inaccurate, and it is determined that the network bandwidth is reduced. Therefore, the downloading of the first media file and all downloaded data blocks are abandoned, and it is determined that a second media file in the streaming media resource is a to-be-downloaded media file according to new network bandwidth $W_{new}$.

An embodiment of the present invention further provides a streaming media resource downloading apparatus that implements the steps and the methods in the foregoing method embodiments.

Figure 4:
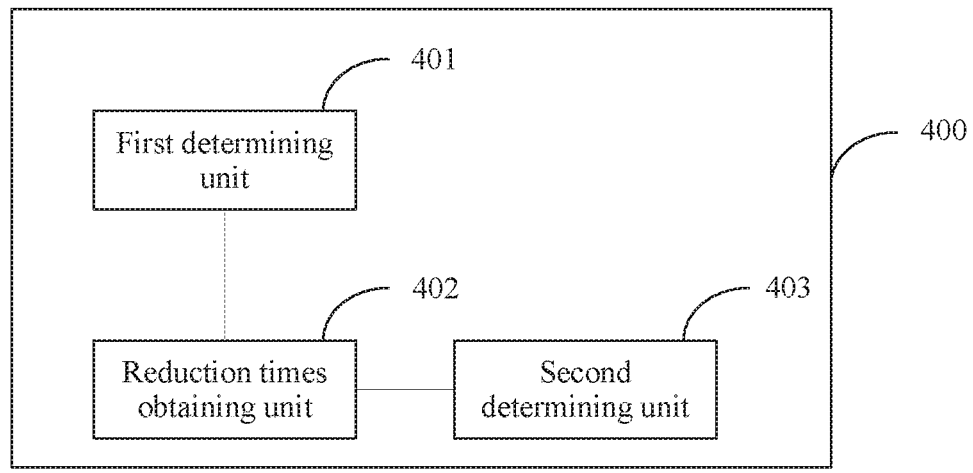
FIG. 4 is a schematic diagram of a streaming media resource downloading apparatus according to an embodiment of the present invention.

FIG. 4 is a schematic diagram of a streaming media resource downloading apparatus according to an embodiment of the present invention. As shown in FIG. 4, a streaming media resource downloading apparatus 400 includes: a first determining unit 401, a reduction times obtaining unit 402, and a second determining unit 403, where the first determining unit 401 is configured to determine that a first media file is a to-be-downloaded media file according to first network bandwidth.

The first network bandwidth is network bandwidth when it is determined that the first media file is a to-be-downloaded media file; and the first media file is included in a streaming media resource corresponding to the first network bandwidth, and the first media file includes N data blocks, where N≥2, and N is an integer.

The reduction times obtaining unit 402 is configured to obtain network bandwidth reduction times in an executed first media file downloading process; and the second determining unit 403 is configured to: after an $(n-1)^{th}$ data block in the first media file is downloaded, and before an $n^{th}$ data block in the first media file is downloaded, determine a length of the to-be-downloaded $n^{th}$ data block according to the network bandwidth reduction times that are in the executed first media file downloading process and that are obtained by the reduction times obtaining unit 502, where n≥2.

Further, when obtaining the network bandwidth reduction times in the executed first media file downloading process, the reduction times obtaining unit 402 obtains the network bandwidth reduction times according to the following rules:

when i−x>0, increasing the network bandwidth reduction times by 1;

where i is a bandwidth level corresponding to the first network bandwidth, and x is a bandwidth level corresponding to network bandwidth detected at an $m^{th}$ time, where the bandwidth level is an integer, m is an integer greater than or equal to 1, and bandwidth corresponding to i is greater than bandwidth corresponding to x.

Further, when determining the length of the to-be-downloaded $n^{th}$ data block according to the network bandwidth reduction times that are in the executed first media file downloading process and that are obtained by the reduction times obtaining unit 402, the second determining unit 403 is specifically configured to:

when the network bandwidth reduction times in the executed first media file downloading process are equal to 0, determine that the length of the to-be-downloaded $n^{th}$ data block is a preset length, where the preset length is corresponding to the first media file; or when the network bandwidth reduction times in the executed first media file downloading process are greater than 0 and less than a first threshold, determine that the length of the to-be-downloaded $n^{th}$ data block is less than a preset length; or when the network bandwidth reduction times in the executed first media file downloading process are greater than or equal to a first threshold, stop downloading the first media file. In addition, the first determining unit 401 determines that a second media file is a to-be-downloaded media file according to second network bandwidth, where the second network bandwidth is network bandwidth when it is determined that the network bandwidth reduction times are greater than or equal to the first threshold; and the second media file is included in a streaming media resource corresponding to the second network bandwidth.

Further, the second determining unit 403 uses the following rules when determining that the length of the to-be-downloaded $n^{th}$ data block is the preset length:

when there are more network bandwidth reduction times in the executed first media file downloading process, determining that the length of the $n^{th}$ data block is smaller; or when there is a larger time difference between a current moment and a moment of starting to download the first media file, determining that the length of the $n^{th}$ data block is smaller.

In this embodiment of the present invention, in a downloading process, it is determined, according to network bandwidth reduction times in a first media file downloading process, that a length of a to-be-downloaded data block can adapt to a requirement, of reduced network bandwidth, on the length of the to-be-downloaded data block, and times of resource downloading switching are reduced. This avoids a resource waste, and video playing is smooth.

The streaming media resource downloading apparatus provided in this embodiment of the present invention is configured to implement the methods shown in the embodiments shown in FIG. 1 to FIG. 3. For details of a working principle and a working process of the streaming media resource downloading apparatus, and of a technical effect generated by the streaming media resource downloading apparatus, refer to the embodiments shown in FIG. 1 to FIG. 3, and details are not described herein.

Figure 5:
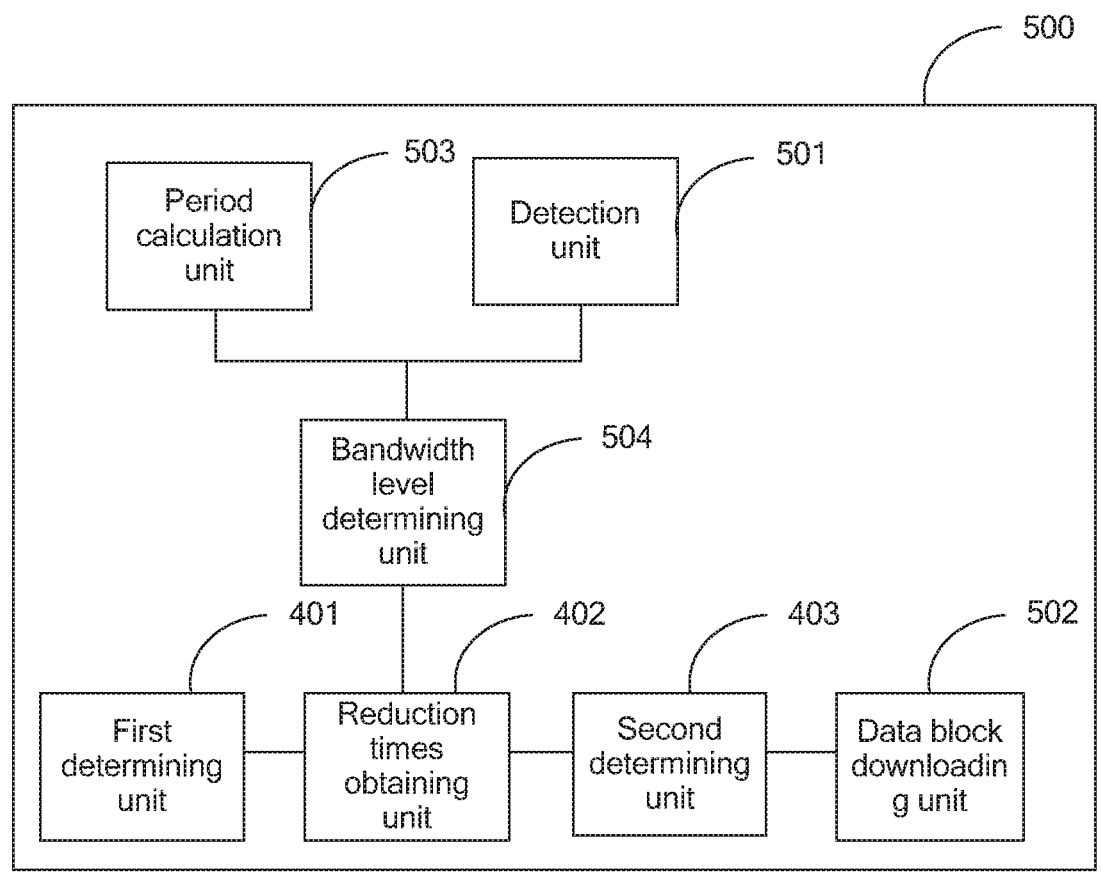
FIG. 5 is a schematic diagram of another streaming media resource downloading apparatus according to an embodiment of the present invention.

FIG. 5 is a schematic diagram of another streaming media resource downloading apparatus according to an embodiment of the present invention. On the basis of the embodiment shown in FIG. 4, as shown in FIG. 5, the streaming media resource downloading apparatus 500 further includes a detection unit 501.

The detection unit 501 is configured to periodically detect network bandwidth in the first media file downloading process.

The reduction times obtaining unit 402 is configured to obtain the network bandwidth reduction times in the executed first media file downloading process according to the network bandwidth periodically detected by the detection unit 501.

In the first media file downloading process, the detection unit 501 constantly and periodically detects network bandwidth at a current moment. When a time difference between a current moment and a last time of network bandwidth detection is greater than or equal to a detection period, the detection unit 501 executes network bandwidth detection at the current time, and the reduction times obtaining unit 402 obtains the network bandwidth reduction times in the executed first media file downloading process according to a network bandwidth result periodically detected by the detection unit 501.

Further, the streaming media resource downloading apparatus 500 further includes a data block downloading unit 502.

The data block downloading unit 502 is configured to: after the second determining unit 403 determines the length of the to-be-downloaded $n^{th}$ data block, download the $n^{th}$ data block according to the length, of the $n^{th}$ data block, determined by the second determining unit.

Further, the streaming media resource downloading apparatus 500 further includes a period calculation unit 503 and a bandwidth level determining unit 504.

The period calculation unit 503 is configured to calculate a detection period of periodic network bandwidth detection in the first media file downloading process. The detection unit 501 may execute network bandwidth detection according to the detection period obtained by the period calculation unit 503 by calculation.

The period calculation unit 503 may determine the detection period in the following manner:

when i−x>k, determining that $T_{m+1}$>T; or when 0≤i−x<k, determining that $T_{m+1}$=T;

where i is the bandwidth level corresponding to the first network bandwidth, and x is the bandwidth level corresponding to the network bandwidth detected at the $m^{th}$ time, where the bandwidth level is an integer, m is an integer greater than or equal to 1, the bandwidth corresponding to i is greater than the bandwidth corresponding to x, and k is a preset threshold for changing the detection period; and T is the network bandwidth detection period, and $T_{m+1}$ is a network bandwidth detection period at an $(m+1)^{th}$ time, where $T_{m+1}=t_{m+1}-t_m$, $t_{m+1}$ is a network bandwidth detection moment at the $(m+1)^{th}$ time, and $t_m$ is a network bandwidth detection moment at the $m^{th}$ time.

The bandwidth level determining unit 504 is configured to determine, in the following manner, a bandwidth level corresponding to a network bandwidth detected by the detection unit 501:

A streaming media resource includes multiple streaming media resources having different network bandwidth thresholds; a network bandwidth threshold is included in a sub-index file of a streaming media resource, and is corresponding to a bandwidth level of the streaming media resource; and when $W_i \times a \leq W_{detected} < W_{i+1} \times b$, it is determined that the bandwidth level corresponding to the detected network bandwidth is i, where $W_{detected}$ is the detected network bandwidth, $W_i$ is a network bandwidth threshold corresponding to the bandwidth level i, and $W_{i+1}$ is a network bandwidth threshold corresponding to a bandwidth level i+1, where 0<a<1, and 0<b<1.

When network bandwidth frequently changes, a network bandwidth detection result obtained by using a network bandwidth estimation method has a large error, and consequently, a media file being downloaded needs to be frequently switched. In this embodiment of the present invention, a length of a to-be-downloaded data block in a first media file is determined according to network bandwidth reduction times in an executed first media file downloading process, so that a to-be-downloaded streaming media resource can better adapt to network bandwidth reduction. This avoids a resource waste caused by inaccurate switching of a streaming media resource being downloaded because of an inaccurate network bandwidth detection result, and accuracy of a network bandwidth detection result is improved.

The streaming media resource downloading apparatus provided in this embodiment of the present invention is configured to implement the methods shown in the embodiments shown in FIG. 1 to FIG. 3. For details of a working principle and a working process of the streaming media resource downloading apparatus, and of a technical effect generated by the streaming media resource downloading apparatus, refer to the embodiments shown in FIG. 1 to FIG. 3, and details are not described herein.

Figure 6:
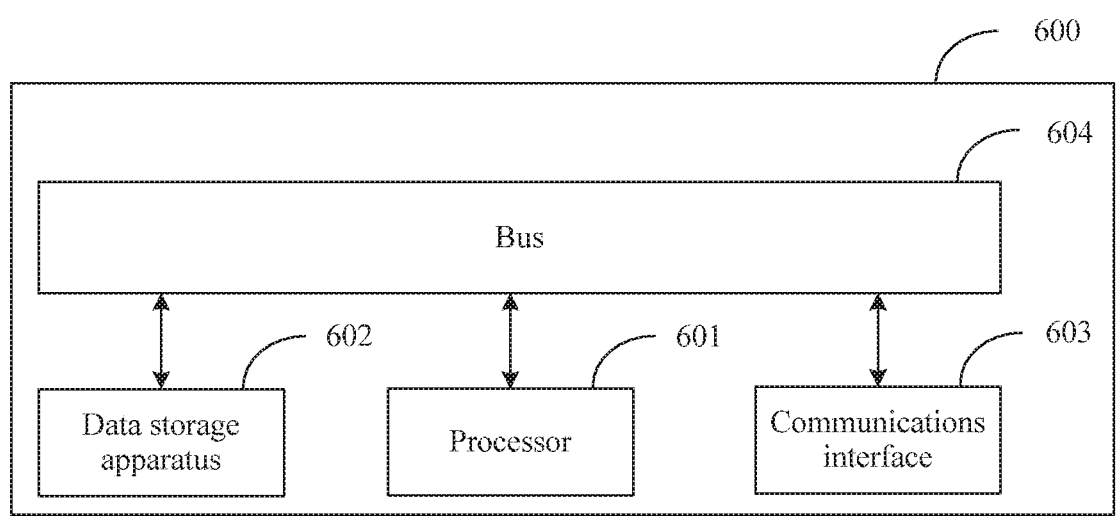
FIG. 6 is a schematic diagram of a terminal device according to an embodiment of the present invention.

FIG. 6 is a schematic diagram of a terminal device according to an embodiment of the present invention.

A terminal device 600 in this embodiment of the present invention includes a processor 601 coupled to one or more data storage apparatuses, a data storage apparatus 602, a communications interface 603, and a bus 604.

The data storage apparatus 602 may include a storage medium and a memory unit. The storage medium may be read-only, such as a read-only memory (ROM), or may be readable/writable, such as a hard disk or a flash memory. The memory unit may be a random access memory (RAM). The memory unit may be physically integrated with the processor 601, or integrated into the processor 601, or may be constructed in one or more independent units.

The processor 601 is a control center of the terminal device 600, and provides a ranking and processing facility to execute an instruction, execute an interruption operation, and provide a timing function and many other functions. Optionally, the processor 601 includes one or more central processing units (CPU), and optionally, the terminal device 600 includes at least one processor. The processor 601 may be a single-core (single-CPU) processor or a multi-core (multi-CPU) processor. The term "processor" used in this specification refers to one or more devices, circuits, and/or processing cores that are used to process data such as a computer program instruction.

The processor 601 may execute program code stored in the data storage apparatus 602. Optionally, the program code stored in the storage medium of the data storage apparatus 602 may be copied to the memory unit for execution by the processor. The processor may execute at least one kernel (for example, a kernel in operating systems sold in trademarks such as LINUZ™, UNIX™, WINDOWS™, ANDROID™, and IOS™). As is known to all, the kernel is used to control an operation of the terminal device 600 by controlling execution of another program or process, controlling communication with a peripheral device, and controlling use of a computing device resource.

The terminal device 600 further includes the communications interface 603, configured to communicate with another device or system directly or by using an external network.

The foregoing elements of the terminal device 600 may be coupled to each other by using any one or any combination of buses 604 such as a data bus, an address bus, a control bus, an extended bus, and a local bus.

Optionally, the terminal device 600 further includes an output device and an input device (which are not shown in the figure). The output device is coupled to the processor 601, and can display information in one or more manners. An example of the output device is a visual display unit, such as a liquid crystal display (LCD), a light-emitting diode (LED) display, a cathode ray tube (CRT), or a projector. The input device is also coupled to the processor 601, and can receive input from a user of the terminal device 600 in one or more manners. An example of the input device includes a mouse, a keyboard, a touchscreen device, a sensor device, or the like.

The terminal device 600 may be a general computing device or an application-specific computing device. As a practical example, the foregoing terminal device 600 may be a desktop computer, a notebook computer, a network server, a personal digital assistant (PDA), a mobile phone, a tablet computer, a wireless terminal device, a telecommunications device, an embedded system, or any another device having a structure similar to that in FIG. 6. However, the present invention is not limited to merely any specific type of terminal device.

According to the terminal device 600 in this embodiment of the present invention, when the processor 601 executes an instruction of the program code in the data storage apparatus, the instruction instructs the processor 601 to execute the following operations:

determining that a first media file is a to-be-downloaded media file according to first network bandwidth, where the first network bandwidth is network bandwidth when it is determined that the first media file is a to-be-downloaded media file; and the first media file is included in a streaming media resource corresponding to the first network bandwidth, and the first media file includes N data blocks, where N≥2, and N is an integer; and after an $(n-1)^{th}$ data block in the first media file is downloaded, and before an $n^{th}$ data block in the first media file is downloaded, the processor 601 determines a length of the to-be-downloaded $n^{th}$ data block according to network bandwidth reduction times in an executed first media file downloading process, where 1≤n≤N.

Further, the processor 601 in this embodiment of the present invention further executes the following operations: periodically detecting network bandwidth in the first media file downloading process to obtain periodically detected network bandwidth; and obtaining the network bandwidth reduction times in the executed first media file downloading process according to the periodically detected network bandwidth.

Further, the processor 601 in this embodiment of the present invention determines, in the following manner, a bandwidth level corresponding to a detected network bandwidth: A streaming media resource includes multiple streaming media resources having different network bandwidth thresholds; a network bandwidth threshold is included in a sub-index file of a streaming media resource, and is corresponding to a bandwidth level of the streaming media resource; when $W_i \times a \le W_{detected} < W_{i+1} \times b$, it is determined that the bandwidth level corresponding to the detected network bandwidth is i, where $W_{detected}$ is the detected network bandwidth, $W_i$ is a network bandwidth threshold corresponding to the bandwidth level i, and $W_{i+1}$ is a network bandwidth threshold corresponding to a bandwidth level i+1, where 0<a<1, and 0<b<1.

Further, when executing periodic network bandwidth detection in the first media file downloading process, the processor 601 in this embodiment of the present invention determines a detection period in the following manner:

when i−x≥k, determining that $T_{m+1} > T$; or
when 0≤i−x<k, determining that $T_{m+1} = T$;

where i is a bandwidth level corresponding to the first network bandwidth, and x is a bandwidth level corresponding to network bandwidth detected at an $m^{th}$ time, where the bandwidth level is an integer, m is an integer greater than or equal to 1, bandwidth corresponding to i is greater than bandwidth corresponding to x, and k is a preset second threshold; and T is a preset network bandwidth detection period, and $T_{m+1}$ is a network bandwidth detection period at an $(m+1)^{th}$ time, where $T_{m+1} = t_{m+1} - t_m$, $t_{m+1}$ is a network bandwidth detection moment at the $(m+1)^{th}$ time, and $t_m$ is a network bandwidth detection moment at the $m^{th}$ time.

Further, the processor 601 in this embodiment of the present invention obtains the network bandwidth reduction times according to the following rules:

when i−x>0, increasing the network bandwidth reduction times by 1, where i is the bandwidth level corresponding to the first network bandwidth, and x is the bandwidth level corresponding to the network bandwidth detected at the $m^{th}$ time, where the bandwidth level is an integer, m is an integer greater than or equal to 1, and the bandwidth corresponding to i is greater than the bandwidth corresponding to x.

Further, that the processor 601 in this embodiment of the present invention determines the length of the to-be-downloaded $n^{th}$ data block according to the network bandwidth reduction times in the executed first media file downloading process specifically includes:

When the network bandwidth reduction times in the executed first media file downloading process are equal to 0, the processor 601 determines that the length of the to-be-downloaded data block is equal to the preset length of the to-be-downloaded data block, and starts to download the to-be-downloaded data block; or when the network bandwidth reduction times in the executed first media file downloading process are greater than or equal to 0, and less than a preset threshold w, the processor 601 reduces the length of the to-be-downloaded data block, so that the length of the to-be-downloaded data block is less than the preset length of the to-be-downloaded data block, and continues to download the to-be-downloaded data block in the first media file.

The processor 601 may adjust the length of the to-be-downloaded data block according to the network bandwidth reduction times in the executed first media file downloading process or a time difference between a current moment to a moment of starting to download the first media file. More reduction times or a larger time difference indicates a smaller length of the to-be-downloaded data block.

When the network bandwidth reduction times in the executed first media file downloading process are greater than or equal to the preset threshold w, the processor 601 stops downloading the first media file, and determines that the length of the to-be-downloaded data block in the first media file is 0.

The processor 601 executes the following steps: determines that a second media file is a to-be-downloaded media file according to second network bandwidth, where the second network bandwidth is network bandwidth when it is determined that the network bandwidth reduction times are greater than or equal to the preset threshold w; and the second media file is included in a streaming media resource corresponding to the second network bandwidth.

According to the terminal device in this embodiment of the present invention, a processor adjusts a length of a to-be-downloaded data block in a first media file according to network bandwidth reduction times in an executed first media file downloading process, so that a to-be-downloaded streaming media resource better adapts to network bandwidth reduction. This avoids a resource waste caused by inaccurate switching of a streaming media resource being downloaded because of an inaccurate network bandwidth detection result, and accuracy of a network bandwidth detection result is improved.

The terminal device provided in this embodiment of the present invention is configured to implement the methods shown in the embodiments shown in FIG. 1 to FIG. 3. For details of a working principle and a working process of the terminal device, and of a technical effect generated by the terminal device, refer to the embodiments shown in FIG. 1 to FIG. 3, and details are not described herein.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely examples of embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A streaming media resource downloading method, comprising:
   determining that a first media file is a to-be-downloaded media file according to a first network bandwidth, wherein the first network bandwidth is network bandwidth when the first media file is a to-be-downloaded media file, and the first media file is in a streaming media resource corresponding to the first network bandwidth and the first media file comprises N data blocks, wherein N is $\geq 2$, and N is an integer; and
   after an $(n-1)^{th}$ data block in the first media file is downloaded, and before an $n^{th}$ data block in the first media file is downloaded, determining a length of the $n^{th}$ data block according to a number of times network bandwidth has reduced during a process of downloading the first media file, wherein $1 \leq n \leq N$.

2. The method according to claim 1, further comprising:
   periodically detecting network bandwidth in the first media file downloading process; and
   obtaining the number of times the network bandwidth has reduced during the first media file downloading process according to the periodically detected network bandwidth.

3. The method according to claim 1, wherein determining the length of the to-be-downloaded $n^{th}$ data block according to the number of times network bandwidth has reduced during the first media file downloading process comprises:
   when the number of times the network bandwidth has reduced during the first media file downloading process is equal to 0, determining that the length of the $n^{th}$ data block is a preset length, wherein the preset length corresponds to the first media file; or
   when the number of times the network bandwidth has reduced during the first media file downloading process is greater than 0 and less than a first threshold, determining that the length of the to-be-downloaded $n^{th}$ data block is less than the preset length, wherein the preset length is corresponding to the first media file.

4. The method according to claim 3, further comprising: when the number of times the network bandwidth has reduced during the first media file downloading process is greater than 0 and less than the first threshold, using the following rules to determine the length of the to-be-downloaded $n^{th}$ data block:
   the number of times the network bandwidth has reduced during the first media file downloading process is in an inverse relationship with the length of the $n^{th}$ data block; or
   time difference between a current moment and a moment of starting to download the first media file, is in an inverse relationship with the length of the $n^{th}$ data block.

5. The method according to claim 1, wherein after determining a length of the to-be-downloaded $n^{th}$ data block, the method further comprises:
   downloading the $n^{th}$ data block according to the determined length of the $n^{th}$ data block.

6. The method according to claim 1, further comprising:
   when the number of times the network bandwidth has reduced during the first media file downloading process is greater than or equal to a first threshold, stopping downloading the first media file; and
   determining that a second media file is a to-be-downloaded media file according to a second network bandwidth, wherein the second network bandwidth is network bandwidth when it is determined that the number of time the network bandwidth has reduced is greater than or equal to the first threshold; and, wherein
   the second media file is in a streaming media resource corresponding to the second network bandwidth.

7. The method according to claim 2, further comprising: when the network bandwidth in the first media file downloading process is periodically detected, determining a detection period in the following manner:
   when $i-x \geq k$, determining that $T_{m+1} > T$; or
   when $0 \leq i-x < k$, determining that $T_{m+1} = T$;
   wherein i is a bandwidth level corresponding to the first network bandwidth, and x is a bandwidth level corresponding to network bandwidth detected at an $m^{th}$ time, wherein the bandwidth level is an integer, m is an integer greater than or equal to 1, bandwidth corresponding to i is greater than bandwidth corresponding to x, and k is a preset second threshold; and
   T is a preset detection period, and $T_{m+1}$ is a network bandwidth detection period at an $(m+1)^{th}$ time, wherein $T_{m+1} = t_{m+1} - t_m$, $t_{m+1}$ is a network bandwidth detection moment at the $(m+1)^{th}$ time, and tm is a network bandwidth detection moment at the $m^{th}$ time.

8. The method according to claim 2, further comprising: obtaining the network bandwidth reduction times according to the following rules:
   when $i-x > 0$, increasing the network bandwidth reduction times by 1, wherein
   i is the bandwidth level corresponding to the first network bandwidth, and x is the bandwidth level corresponding to the network bandwidth detected at the $m^{th}$ time, wherein the bandwidth level is an integer, m is an integer greater than or equal to 1, and the bandwidth corresponding to i is greater than the bandwidth corresponding to x.

9. The method according to claim 7, further comprising: determining, in the following manner, a bandwidth level corresponding to a detected network bandwidth:

the streaming media resource comprises multiple media files that are respectively corresponding to different bandwidth levels;

each bandwidth level corresponds to one network bandwidth threshold; and when $W_i \times a \leq W_{detected} < W_{i+1} \times b$, it is determined that the bandwidth level corresponding to the detected network bandwidth is i, wherein $W_{detected}$ is the detected network bandwidth, $W_i$ is a network bandwidth threshold corresponding to the bandwidth level i, and $W_{i+1}$ is a network bandwidth threshold corresponding to a bandwidth level i+1, wherein $0<a<1$, and $0<b<1$.

10. A terminal device, comprising:
a processor;
a data storage apparatus;
a communications interface;
wherein the processor, the data storage apparatus, and the communications interface are configured to communicate with each other by using a bus; and
wherein the processor reads program code stored in the data storage apparatus, and the program code, when executed by the processor, causes the processor to:
determining that a first media file is a to-be-downloaded media file according to a first network bandwidth, wherein the first network bandwidth is network bandwidth when the first media file is a to-be-downloaded media file, and the first media file is in a streaming media resource corresponding to the first network bandwidth and the first media file comprises N data blocks, wherein N is $\geq 2$, and N is an integer; and after an $(n-1)^{th}$ data block in the first media file is downloaded, and before an $n^{th}$ data block in the first media file is downloaded, determine a length of the $n^{th}$ data block according to a number of times network bandwidth has reduced during a process of downloading the first media file, wherein $1 \leq n \leq N$.

11. The terminal device according to claim 10, wherein the program code, when executed by the processor, causes the processor to:
periodically detect network bandwidth in the first media file downloading process; and
obtain the number of times the network bandwidth has reduced during the first media file downloading process according to the periodically detected network bandwidth.

12. The terminal device according to claim 10, wherein to determine the length of the to-be-downloaded $n^{th}$ data block according to the number of times network bandwidth has reduced during the first media file downloading process comprises:
when the number of times the network bandwidth has reduced during the first media file downloading process is equal to 0, determine that the length of the $n^{th}$ data block is a preset length, wherein the preset length corresponds to the first media file; or
when the number of times the network bandwidth has reduced during the executed first media file downloading process is greater than 0 and less than a first threshold, determine that the length of the to-be-downloaded $n^{th}$ data block is less than a preset length, wherein the preset length is corresponding to the first media file.

13. The terminal device according to claim 12, wherein when the number of times the network bandwidth has reduced during in the first media file downloading process is greater than 0 and less than the first threshold, using the following rules to determine the length of the to-be-downloaded $n^{th}$ data block:
the number of times the network bandwidth has reduced during the first media file downloading process is in an inverse relationship with the length of the $n^{th}$ data block; or
time difference between a current moment and a moment of starting to download the first media file, is in an inverse relationship with the length of the $n^{th}$ data block.

14. The terminal device according to claim 10, wherein after determining the length of the to-be-downloaded $n^{th}$ data block, the processor executes, according to the determined length of the $n^{th}$ data block, an operation of downloading the $n^{th}$ data block.

15. The terminal device according to claim 10, wherein the processor further executes the following operations:
when the number of times the network bandwidth has reduced during the first media file downloading process is greater than or equal to a first threshold, stopping downloading the first media file; and
determine that a second media file is a to-be-downloaded media file according to a second network bandwidth, wherein the second network bandwidth is network bandwidth when it is determined that the number of time the network bandwidth has reduced is greater than or equal to the first threshold; and, wherein
the second media file is in a streaming media resource corresponding to the second network bandwidth.

16. The terminal device according to claim 11, wherein to periodically detect network bandwidth in the first media file downloading process, the program code, when executed by the processor, causes the processor to:
when $i - x \geq k$, determining that $T_{m+1} > T$; or
when $0 \leq i - x < k$, determining that $T_{m+1} = T$;
wherein i is a bandwidth level corresponding to the first network bandwidth, and x is a bandwidth level corresponding to network bandwidth detected at an $m^{th}$ time, wherein the bandwidth level is an integer, m is an integer greater than or equal to 1, bandwidth corresponding to i is greater than bandwidth corresponding to x, and k is a preset second threshold; and
T is a preset detection period, and $T_{m+1}$ is a network bandwidth detection period at an $(m+1)^{th}$ time, wherein $T_{m+1} = t_{m+1} - tm$, $t_{m+1}$ is a network bandwidth detection moment at the $(m+1)^{th}$ time, and tm is a network bandwidth detection moment at the $m^{th}$ time.

17. The terminal device according to claim 11, wherein to obtain the network bandwidth reduction times, the program code, when executed by the processor, causes the processor to:
when $i - x > 0$, increase the network bandwidth reduction times by 1, wherein
i is the bandwidth level corresponding to the first network bandwidth, and x is the bandwidth level corresponding to the network bandwidth detected at the $m^{th}$ time, wherein the bandwidth level is an integer, m is an integer greater than or equal to 1, and the bandwidth corresponding to i is greater than the bandwidth corresponding to x.

18. The terminal device according to claim 16, wherein to determine a bandwidth level corresponding to a detected network bandwidth, the program code, when executed by the processor, causes the processor to:

when $W_i \times a \leq W_{detected} < W_{i+1} \times b$, it is determined that the bandwidth level corresponding to the detected network bandwidth is i, wherein $W_{detected}$ is the detected network bandwidth, $W_i$ is a network bandwidth threshold corresponding to the bandwidth level i, and $W_{i+1}$ is a network bandwidth threshold corresponding to a bandwidth level i+1, wherein $0<a<1$, and $0<b<1$, the streaming media resource comprises multiple media files that are respectively corresponding to different bandwidth levels, and each bandwidth level is corresponding to one network bandwidth threshold.

\* \* \* \* \*